March 29, 1938.    H. B. BROWN    2,112,648

THERMOMETER

Filed July 3, 1937

INVENTOR.
H. BRAINARD BROWN
BY
D. Clyde Jones
ATTORNEY.

Patented Mar. 29, 1938

2,112,648

UNITED STATES PATENT OFFICE 2,112,648

THERMOMETER

H. Brainard Brown, Rochester, N. Y., assignor to Taylor Instrument Companies, Rochester, N. Y., a corporation of New York Application July 3, 1937, Serial No. 151,886

4 Claims. (Cl. 73—343)

This invention relates to thermometers and particularly to a thermometer adapted to indicate the temperature of fluid discharging from a faucet or pipe.

An object of the invention is to provide a thermometer which may be readily applied to the discharge end of a pipe or faucet and which is of such construction that the stream of discharged fluid is directed against the thermometer bulb and yet the faucet is prevented from contacting the bulb.

Figure 1:
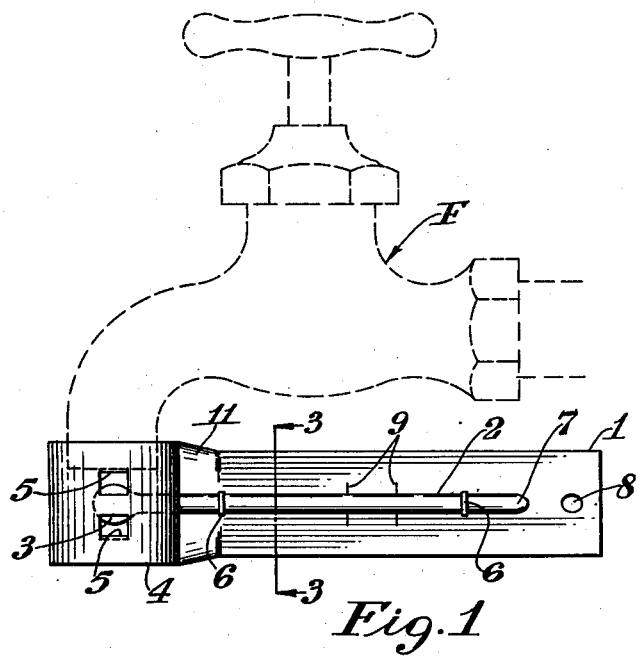
Figure 2:
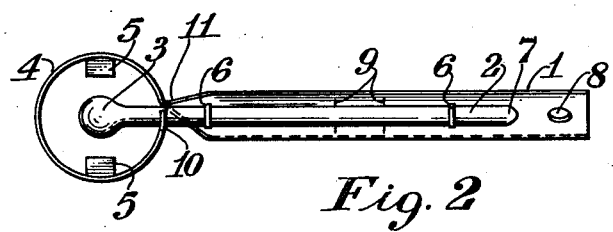

In the drawing Fig. 1 is a side view of the device shown in operative relation to a faucet, the faucet being indicated by dotted lines; Fig. 2 is a top plan view of the device; and Fig. 3 is a section taken on line 3—3 of Fig. 1.

The present thermometer comprises a graduated back or scale plate 1 which has secured on one face thereof, a conventional thermometer tube 2 terminating in a bulb 3. The thermometer tube is secured to the back by means of the clasps 6 and is retained against longitudinal movement relative to the back by means of a conventional hook portion 7 formed on one end of the thermometer tube and disposed in an opening in the thermometer back (not shown). The bulb 3 of the thermometer tube projects into sleeve 4 preferably integral with back and having a faucet passage therethrough extending at right angles to the major axis of this back. Spaced pairs of diametrically opposed lugs or stops 5 extend inwardly from the inner surface of the sleeve in spaced relation to the open ends of the sleeve 4 (Fig. 3) to prevent the faucet from engaging the thermometer bulb 3. As shown in Figs. 2 and 3 of the drawing, the plane of the thermometer back is inclined with respect to the axis through the open ends of the sleeve 4. The end of the back 1 opposite the sleeve 4 may be provided with an aperture 8 whereby the thermometer may be suspended from a nail or the like when not in use.

Figure 3:
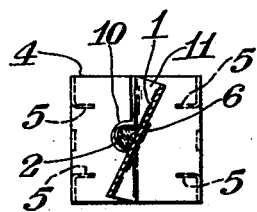

In the preferred construction the back is made from an elongated flat strip of aluminum or other suitable material, graduated as indicated at 9 and notched at one end as at 10 to provide a clearance for the thermometer tube (see Fig. 3). The stops 5 are struck out from the strip adjacent the notched end thereof. The sleeve or guard is formed by rolling the notched end of back on itself, the struck-out stops projecting into the interior of the sleeve. The straight portion of the strip which forms the back 2 of the thermometer is twisted or bent adjacent the sleeve 4 as indicated at 11, so that the plane of the back is inclined with relation to the mentioned axis of the sleeve so that the plane of the graduated portion of the back, during use, will be perpendicular to the line of sight of the observer to facilitate reading. In completing the thermometer, the thermometer tube 2 is secured to the back by means of clasps 6.

The thermometer is adapted to be used by placing the sleeve-like portion 4 of the back over the end of a faucet F, or other fluid discharging means so that the stream discharged therefrom will be guided to the thermometer bulb. The stops 5 prevent the faucet from coming into contact with and thereby preventing injury to the thermometer bulb 3. The sleeve 4 and stops 5 also function as a guard for the thermometer bulb when the thermometer is not in use.

I claim:

1. A thermometer comprising a back, a sleeve at one end of said back, said sleeve having a passage therethrough extending at right angles to long axis of said back and of a size adapted to receive a faucet, and a thermometer tube carried by said back with the bulb portion of said tube projecting into said sleeve.

2. A thermometer comprising a back, a sleeve integral with one end of said back, said sleeve having a passage therethrough extending at right angles to long axis of said back and of a size adapted to receive a faucet, and a thermometer tube carried by said back with the bulb portion of said tube projecting into said sleeve.

3. A thermometer comprising a back, one end of said back terminating in a sleeve-like portion having a passage therethrough adapted to receive a faucet, the plane of said back being inclined relative to the axis of said passage, and a thermometer tube including a bulb carried by said back, said bulb projecting into said sleeve-like portion.

4. A thermometer comprising a back, an open-ended sleeve disposed at one end of the back, stops mounted within said sleeve in spaced relation to each other and in spaced relation to the ends of the sleeve, and a thermometer tube carried by said back with the bulb portion of said tube projecting into said sleeve between said stops.

H. BRAINARD BROWN.